US012604795B2

(12) United States Patent
Hirazawa et al.

(10) Patent No.: US 12,604,795 B2
(45) Date of Patent: Apr. 21, 2026

(54) SPREADING SUPPORT SYSTEM AND SERVER

(71) Applicant: KUBOTA CORPORATION, Osaka (JP)

(72) Inventors: Kazuya Hirazawa, Osaka (JP); Tomohiro Nishikawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 1045 days.

(21) Appl. No.: 17/694,992

(22) Filed: Mar. 15, 2022

(65) Prior Publication Data

US 2022/0192081 A1    Jun. 23, 2022

Related U.S. Application Data

(63) Continuation of application No. PCT/JP2020/036228, filed on Sep. 25, 2020.

(30) Foreign Application Priority Data

Sep. 25, 2019    (JP) ................................. 2019-174568

(51) Int. Cl.
 *A01C 15/00*        (2006.01)
 *A01B 79/00*        (2006.01)
 *A01C 21/00*        (2006.01)
(52) U.S. Cl.
 CPC ............ *A01C 15/00* (2013.01); *A01B 79/005* (2013.01); *A01C 21/00* (2013.01)
(58) Field of Classification Search
 CPC ............................. G06Q 50/02; B64U 2101/40
 See application file for complete search history.

(56) References Cited

U.S. PATENT DOCUMENTS 6,442,486 B1 *    8/2002    Satake .................. G06Q 10/04
                                                            250/226
8,738,244 B2 *    5/2014    Lenz .................... A01C 21/005
                                                            701/41
(Continued)

FOREIGN PATENT DOCUMENTS

CN        205150253 U    4/2016
JP        2008-68709 A    3/2008
(Continued)

OTHER PUBLICATIONS

International Search Report and Written Opinion of the International Searching Authority issued in International Patent Application No. PCT/JP2020/036228, dated Dec. 15, 2020, along with an English translation thereof.

*Primary Examiner* — Fadey S. Jabr
*Assistant Examiner* — Mario C Gonzalez
(74) *Attorney, Agent, or Firm* — GREENBLUM & BERNSTEIN, P.L.C.

(57) ABSTRACT

A spreading support system includes a height difference acquisition unit to acquire a height difference in an agricultural field, a spread amount acquisition unit to acquire a planned spread amount which is an amount of an object to be spread on the agricultural field, a spread amount correction unit to correct, on the basis of the height difference acquired by the height difference acquisition unit, the planned spread amount acquired by the spread amount acquisition unit to obtain a corrected spread amount, and a spread amount output unit to output the corrected spread amount.

12 Claims, 7 Drawing Sheets

(56)                          References Cited

U.S. PATENT DOCUMENTS

| | | | | |
|---|---|---|---|---|
| 2015/0242799 A1* | 8/2015 | Seki | ...................... | A01B 79/005 |
| | | | | 705/7.15 |
| 2017/0127606 A1* | 5/2017 | Horton | ................. | A01B 69/001 |
| 2018/0077852 A1* | 3/2018 | George | .................. | A01G 25/16 |
| 2020/0232794 A1 | 7/2020 | Yanagishita | | |
| 2021/0055417 A1* | 2/2021 | Brokaw | ................. | G01B 11/24 |

FOREIGN PATENT DOCUMENTS

| | | | |
|---|---|---|---|
| JP | 2009-247463 | A | 10/2009 |
| JP | 2013-233117 | A | 11/2013 |
| JP | 2013-234935 | A | 11/2013 |
| JP | 2014-71709 | A | 4/2014 |
| JP | 2017-112942 | A | 6/2017 |
| JP | 2018-82648 | A | 5/2018 |
| JP | 2018-166472 | A | 11/2018 |
| JP | 2019-8749 | A | 1/2019 |
| WO | 2018/168564 | A1 | 9/2018 |

* cited by examiner

Replacement  Sheet
Fig.2A
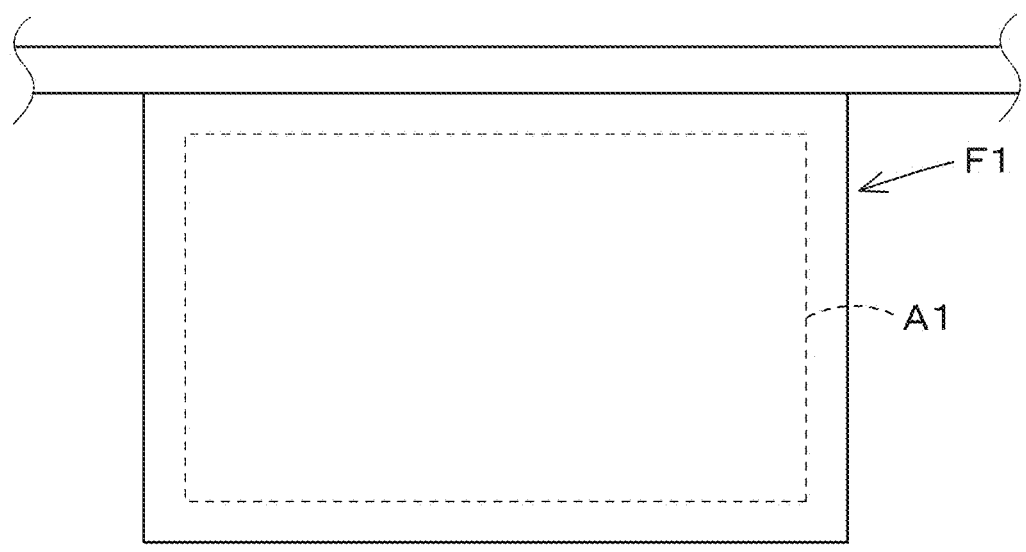

Fig.4

| Height difference $\Delta H1$ | Correction value W1 |
|---|---|
| $+10cm \leqq \Delta H1$ | 1.2 |
| $+5cm < \Delta H1 < +10cm$ | 1.1 |
| $-5cm \leqq \Delta H1 \leqq +5cm$ | 1.0 |
| $-10cm < \Delta H1 < -5cm$ | 0.9 |
| $\Delta H1 \leqq -10cm$ | 0.8 |

Fig. 5

|  | | Yield Dn (kg) | | |
|---|---|---|---|---|
|  | | Yield > A | A ≤ Yield ≤ B | Yield < B |
| Protein content Xn(%) | Protein > C | Spread amount G 1 | Spread amount G 4 | Spread amount G 7 |
|  | C ≤ Protein ≤ D | Spread amount G 2 | Spread amount G 5 | Spread amount G 8 |
|  | Protein < D | Spread amount G 3 | Spread amount G 6 | Spread amount G 9 |

A , B : Reference value of yield

C , D : Reference value of protein

SPREADING SUPPORT SYSTEM AND SERVER

CROSS REFERENCE TO RELATED APPLICATIONS

This application is a continuation application of International Application No. PCT/JP2020/036228, filed on Sep. 25, 2020, which claims the benefit of priority to Japanese Patent Application No. 2019-174568, filed on Sep. 25, 2019. The entire contents of each of these applications are hereby incorporated herein by reference.

BACKGROUND OF THE INVENTION

1. Field of the Invention

The present invention relates to a spreading support system and a server.

2. Description of the Related Art

A technique disclosed in Japanese Unexamined Patent Application Publication No. 2018-82648 is known as a technique to set the amount of fertilizer applied to an agricultural field.

A method of setting the amount of fertilizer to be applied in Japanese Unexamined Patent Application Publication No. 2018-82648 involves a step of acquiring information relating to leaf color and the number of stems of a crop growing in an agricultural field in the current period and determining the amount of nitrogen absorbed by the crop from the acquired information relating to leaf color and the number of stems, a step of determining current nitrogen fertility by subtracting the amount of nitrogen applied in the current period from the amount of absorbed nitrogen, and a step of determining, from the nitrogen fertility and an appropriate nitrogen amount for growth of the crop, the amount of nitrogen to be applied for growth in the next period necessary for the growth of the crop in the next period.

SUMMARY OF THE INVENTION

According to the method of setting the amount of fertilizer to be applied in Japanese Unexamined Patent Application Publication No. 2018-82648, the amount of absorbed nitrogen is determined from leaf color and the number of stems, and the amount of nitrogen to be applied in the next period is further determined. However, what is determined by this method is an estimate of the amount of absorbed nitrogen and may differ from the actual amount of absorbed nitrogen. Furthermore, the estimate does not always suffice in accurately determining the fertilizer retention capacity of soil, and therefore, in reality, it is not always possible to determine the appropriate amount of nitrogen fertilizer to be applied for the crop. Furthermore, even if the amount of absorbed nitrogen or the amount of applied nitrogen fertilizer is the same, the subsequent growth of the crop may differ depending on the geographic features of the agricultural field.

In view of the above issues, an object of the present invention is to provide a spreading support system and a server each of which makes it possible to perform spreading of a to-be-spread object according to the geographical features of an agricultural field.

Technical means of the present invention to attain this technical object is characterized by the following aspects.

A spreading support system includes a height difference acquisition unit to acquire a height difference in an agricultural field, a spread amount acquisition unit to acquire a planned spread amount which is an amount of an object to be spread on the agricultural field, a spread amount correction unit to correct, on the basis of the height difference acquired by the height difference acquisition unit, the planned spread amount acquired by the spread amount acquisition unit to obtain a corrected spread amount, and a spread amount output unit to output the corrected spread amount.

The spreading support system further includes a section setting unit to divide the agricultural field into a plurality of sections, and a spread amount setting unit to set planned spread amounts for the respective plurality of sections, wherein the spread amount acquisition unit acquires the planned spread amounts for the respective plurality of sections set by the spread amount setting unit, the height difference acquisition unit acquires a plurality of the height differences in the respective plurality of sections, and the spread amount correction unit corrects the planned spread amounts for the respective plurality of sections on the basis of the height differences in the respective plurality of sections.

The spreading support system further includes a storage unit to store correction information indicating a relationship between the height difference and a corresponding correction value, wherein the spread amount correction unit corrects the planned spread amount by multiplying the planned spread amount by the correction value indicated by the correction information or by adding the correction value indicated by the correction information to the planned spread amount.

The spread amount acquisition unit acquires the height difference measured by an unmanned air vehicle or an agricultural machine.

The spreading support system further includes a spread amount setting unit to calculate the planned spread amount on the basis of a relationship between a yield of a crop and a component contained in the crop.

A server includes a height difference acquisition unit to acquire a height difference in an agricultural field calculated on the basis of a captured image of the agricultural field captured by an unmanned air vehicle, a spread amount acquisition unit to acquire a planned spread amount which is an amount of an object to be spread on the agricultural field, the planned spread amount being calculated on the basis of a past actual yield of a crop planted in the agricultural field and a predetermined reference yield or being calculated based on a relationship between a yield of the crop and a component contained in the crop, a spread amount correction unit to correct, on the basis of the height difference acquired by the height difference acquisition unit, the planned spread amount acquired by the spread amount acquisition unit to obtain a corrected spread amount, and a spread amount output unit to output the corrected spread amount to a management computer.

A server includes a height difference acquisition unit to acquire a height difference in an agricultural field on the basis of information relating to one or more heights obtained when an agricultural machine travels on the agricultural field, a spread amount acquisition unit to acquire a planned spread amount which is an amount of an object to be spread on the agricultural field, the planned spread amount being calculated on the basis of a past actual yield of a crop planted in the agricultural field and a predetermined reference yield or being calculated based on a relationship between a yield of the crop and a component contained in the crop, a spread amount correction unit to correct, on the basis of the height difference acquired by the height difference acquisition unit, the planned spread amount acquired by the spread amount acquisition unit to obtain a corrected spread amount, and a spread amount output unit to output the corrected spread amount to a management computer.

The server further includes a section setting unit to divide the agricultural field displayed on a settings screen of the management computer into a plurality of sections, wherein the spread amount acquisition unit acquires planned spread amounts for the respective plurality of sections set by a spread amount setting unit, the height difference acquisition unit acquires a plurality of the height differences in the respective plurality of sections, and the spread amount correction unit corrects the planned spread amounts for the respective plurality of sections on the basis of the height differences in the respective plurality of sections.

The server further includes a storage unit to store correction information indicating a relationship between the height difference and a corresponding correction value, wherein the spread amount correction unit corrects the planned spread amount by multiplying the planned spread amount by the correction value indicated by the correction information or by adding the correction value indicated by the correction information to the planned spread amount.

The spread amount correction unit reduces an amount of correction of the planned spread amount as the height difference decreases, and increases the amount of correction of the planned spread amount as the height difference increases.

The above and other elements, features, steps, characteristics and advantages of the present invention will become more apparent from the following detailed description of the preferred embodiments with reference to the attached drawings.

BRIEF DESCRIPTION OF DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 2A is a diagram showing an agricultural field and a planted area.

FIG. 4 is a diagram showing an example of correction information.

FIG. 5 is a diagram showing a relationship between actual yield and protein content.

DETAILED DESCRIPTION OF THE PREFERRED EMBODIMENTS

Figure 1:
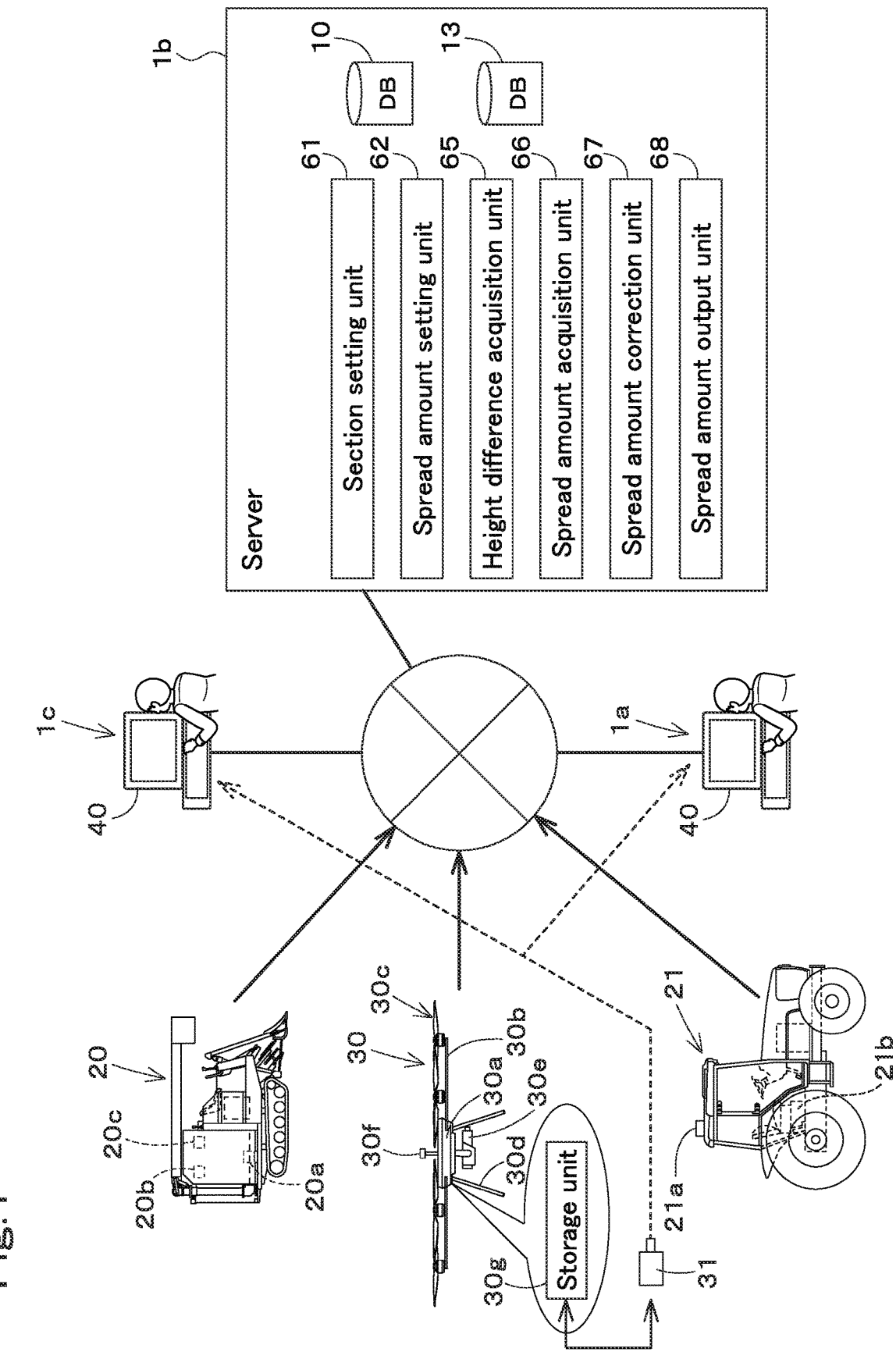
FIG. 1 illustrates a spreading support system.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses embodiments of the present invention with reference to drawings.

FIG. 1 illustrates a spreading support system. The spreading support system is, for example, a system to provide support regarding spreading of a to-be-spread object. The to-be-spread object is, for example, a fertilizer and/or the like. The spreading support system includes a computer.

The computer includes, for example, a management computer $1a$ located in a farmer's property, a farming company, or the like and a server $1b$ to which the management computer $1a$ and the like can be connected. The management computer $1a$ is, for example, a personal computer (PC) assigned to a manager, a worker, or the like. Note that the management computer $1a$ may be a mobile terminal such as a smartphone, a tablet, or a PDA.

As illustrated in FIG. 1, the server $1b$ is a spreading support apparatus to support spreading and is capable of acquiring various data (information). The server $1b$ is capable of acquiring, for example, yield data indicating the yield of a crop in an agricultural field, crop composition data indicating the chemical composition of a crop, growth data indicating the growth state of a crop, and height difference data of an agricultural field. Of these, the yield data and the crop composition data are detected, for example, at a harvester 20 when a crop is harvested. The harvester 20 is a combine that is capable of harvesting crops. The harvester 20 includes a measuring device $20a$, a communication device $20b$, and a position detecting device $20c$. The measuring device $20a$ is a load cell to detect the weight (yield) of the harvested crop and/or a spectroscopic analyzer to measure the protein content and/or water content of the harvested crop. The position detecting device $20c$ is a device to detect the position of the harvester 20, and detects the position (latitude, longitude) of the harvester 20 and/or the like on the basis of data from positioning satellites of, for example, a GPS.

The communication device $20b$ sends, to the server $1b$ and/or the like, at least information acquired at the harvester 20 such as the yield data, the crop composition data (protein content, water content), and/or the position detected by the position detecting device $20c$ (position data). Upon receipt of the yield data, the crop composition data (protein content, water content), and the position data, the server $1b$ stores the received yield data, crop composition data (protein content, water content), and position data in a storage unit (database) 10.

Figure 2B:
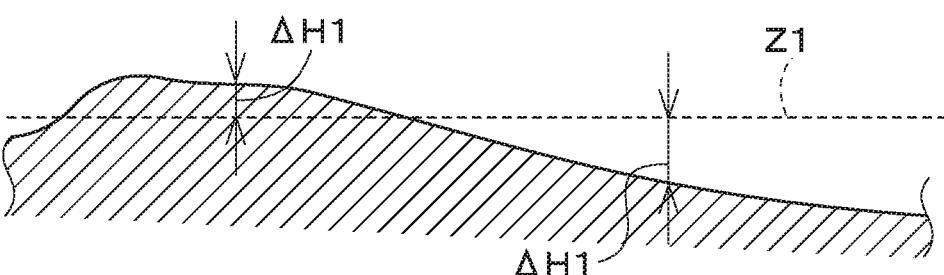
FIG. 2B is a diagram showing height difference.

As illustrated in FIGS. 2A and 2B, the height difference data is data about at least a planted area A1 in which a crop is planted in an agricultural field F1, and is a difference (height difference) $\Delta H1$ between a predetermined reference Z1 and the surface of soil represented in numerical form. Original data of the height difference data and original data of the growth data can each be detected by, for example, an unmanned air vehicle 30 such as a multicopter. The height difference $\Delta H1$ has a positive value if the surface of soil is located higher than the reference Z1, and has a negative value if the surface of soil is located lower than the reference Z1.

The multicopter 30 includes a main body $30a$, at least one arm $30b$ provided on the main body $30a$, at least one rotary wing $30c$ provided on the arm(s) $30b$, and at least one skid $30d$ provided on the main body $30a$. Each rotary wing $30c$ is a device which generates lift for flight. The rotary wing $30c$ includes a rotor which provides a rotational force and blades (propeller) driven by the rotor to rotate.

Furthermore, the multicopter 30 includes an imaging device (measuring device) $30e$. The imaging device $30e$ is a device composed of an infrared camera and/or the like and is capable of capturing an image of a crop in an agricultural field. Furthermore, the multicopter 30 includes a position detecting device 30f. The position detecting device 30f is a device to detect the position of the multicopter 30, and detects the position (latitude, longitude) on the basis of data from positioning satellites of, for example, a GPS. The multicopter 30 flies over an agricultural field and the periphery of the agricultural field to capture an image of a crop in the agricultural field, and associates the position detected by the position detecting device 30f to the image captured by the imaging device 30e (captured image) to obtain captured image data.

The captured image data is stored in a storage unit 30g of the multicopter 30. The captured image data stored in the storage unit 30g of the multicopter 30 is transferred to and stored in an electronic storage medium 31 such as a USB memory and/or an SD card. The captured image data stored in the electronic storage medium 31 is transferred to the management computer 1a or to a stationary management computer 1c located at an aerial photography service company or the like independently of the management computer 1a. The transferred captured image data is stored in the management computer 1a or the management computer 1c. Furthermore, after the management computer 1a or the management computer 1c logs in to the server 1b, the captured image data stored in the management computer 1a or the management computer 1c is sent to the server 1b. Upon receipt of the captured image data, the server 1b stores the received captured image data in the storage unit (database) 10. The server 1b analyzes the captured image data (captured image) to generate growth data using, for example, vegetation indices such as DVI, RVI, NDVI, GNDVI, SAVI, TSAVI, CAI, MTCI, REP, PRI, and/or RSI. The growth data generated by the server 1b is stored in a storage unit 10. The above vegetation indices are examples, and do not imply limitation.

Furthermore, the server 1b compares a plurality of pieces of captured image data (captured images) to calculate a difference, thereby generating height difference data.

Note that the height difference data may be that measured by an agricultural machine such as a tractor 21 other than the unmanned air vehicle 30. For example, the tractor 21 includes a position detecting device 21a and an inertial measurement unit (IMU) 21b. The position detecting device 21a is equal in configuration to the position detecting device 20c, and therefore descriptions therefor are not repeated. The inertial measurement unit 21b includes an acceleration sensor to detect acceleration, a gyroscope sensor to detect angular velocity, and/or the like. The inertial measurement unit 21b is provided on the vehicle body of the tractor 21, and is capable of detecting the roll angle, the pitch angle, the yaw angle, and/or the like of the vehicle body. When the tractor 21 does work in an agricultural field, the inertial measurement unit 21b may measure variations in vertical height and the variations in height may be used as height difference data, and/or the position detecting device 21a may measure variations in height of the tractor 21 and the variations in height may be used as height difference data.

The management computer 1a or the management computer 1c may generate growth data and height difference data from the captured image data and may send the generated growth data and height difference data to the server 1b.

As such, the server 1b is capable of acquiring yield data, crop composition data (protein content, water content), growth data, and height difference data, and storing them as database(s) in the storage unit 10.

The following description is based on the assumption that the yield data, the crop composition data (protein content, water content), the growth data, and the height difference data include position information such as position (latitude, longitude).

The server 1b is capable of preparing a spreading plan for spreading on an agricultural field with reference to the foregoing yield data and/or the like. The spreading plan is a plan of, with regard to at least a predetermined agricultural field, how much to-be-spread object (such as fertilizer) is to be spread and in which part of the agricultural field the to-be-spread object is to be spread.

The server 1b includes a section setting unit 61 and a spread amount setting unit 62. The section setting unit 61 and the spread amount setting unit 62 are each composed of electric/electronic component(s) and/or electric circuit(s) provided in the server 1b, program(s) stored in the server 1b, and/or the like.

For example, when the management computer 1a logs in to the server 1b, a display unit 40 of the management computer 1a displays a menu screen on which a selection is made on a menu or the like. The display unit 40 is composed of a liquid crystal monitor or the like.

Figure 3A:
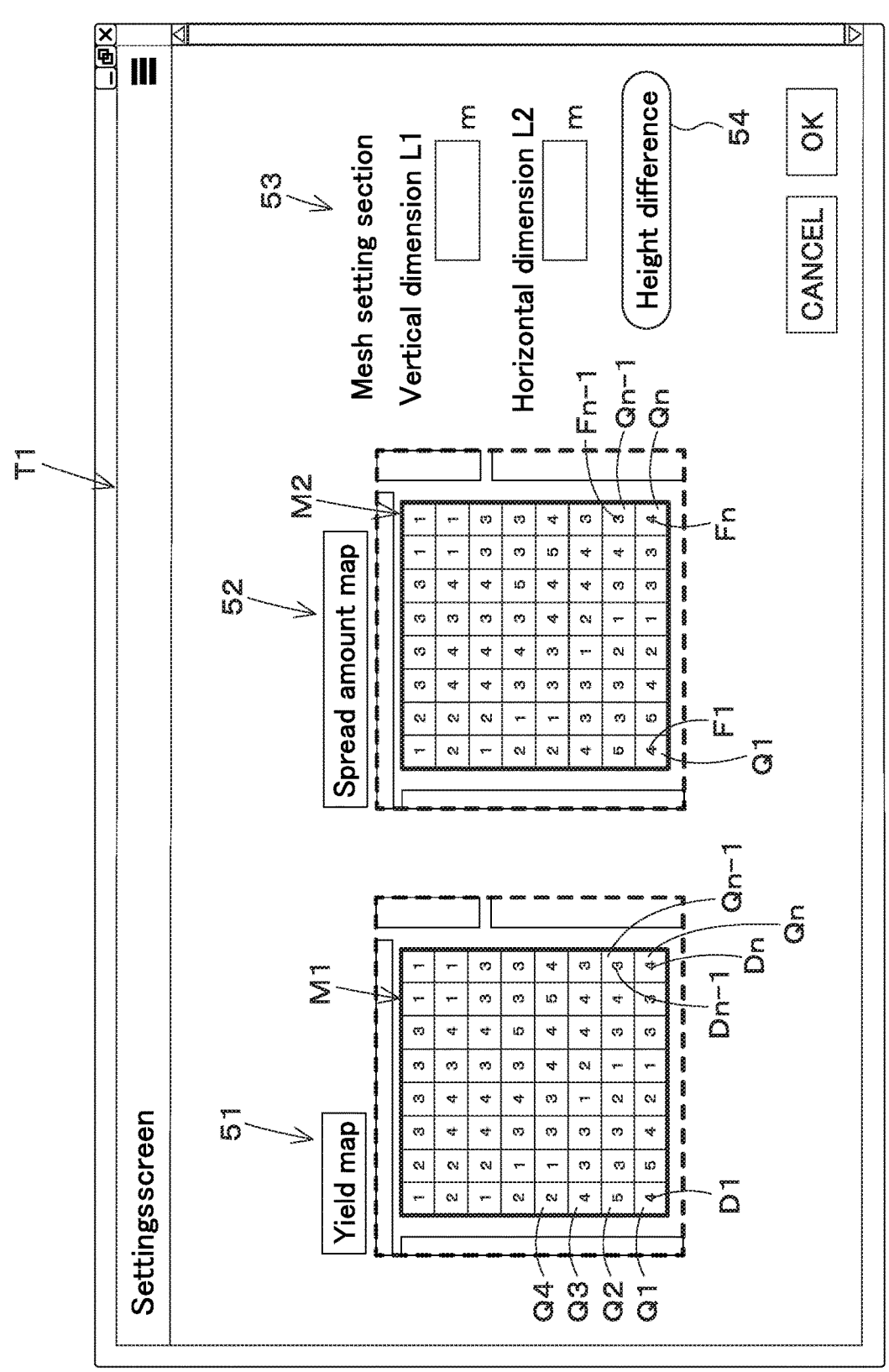
FIG. 3A illustrates a settings screen displaying a yield map and a spread amount map.

When an icon, a button, or the like of a spreading plan is selected and a predetermined operation is performed on the menu screen, the management computer 1a sends to the server 1b a request for preparation of a spreading plan. The server 1b causes the management computer 1a to display a settings screen T1 on which a spreading plan is to be made, as illustrated in FIG. 3A.

The settings screen T1 includes a yield map display section 51 to display a yield map M1, a spread amount map display section 52 to display a spread amount map M2, and a mesh setting section 53. The yield map display section 51 displays a yield map M1 which is a visualization of the yield(s) of the yield data stored in the storage unit 10 of the server 1b. The spread amount map display section 52 displays a spread amount map M2 which is a visualization of the spread amount(s) set according to the yield data and/or the like.

The mesh setting section 53 sets, when the yield map M1 and the spread amount map M2 are to be displayed such that each of them is divided into predetermined sections, a vertical dimension L1 and a horizontal dimension L2 of each section. Once the vertical dimension L1 and the horizontal dimension L2 have been inputted into the mesh setting section 53, the section setting unit 61 prepares sections Qn each having a size of the vertical dimension L1 and the horizontal dimension L2 on the yield map M1 and on the spread amount map M2. Note that the position (latitude, longitude) corresponding to a section Qn is associated with that section Qn, and, when the section Qn is identified, the position thereof is also identified.

With regard to a single yield map M1 indicating a single agricultural field, the section setting unit 61 divides the yield map M1 into a plurality of sections Qn (the number n of sections: n=1, 2, 3 . . . and n) using the vertical dimension L1 and the horizontal dimension L2. On the basis of yield(s) (actual yield(s)) Dnj of the yield data corresponding to each of the plurality of sections Qn (the number n of sections: n=1, 2, 3 . . . and n, the number of pieces of yield data per section: j=1, 2, 3 . . . and j), the section setting unit 61 calculates a yield Dn of that section. For example, in the case where a single section includes two yields Dn1 and Dn2, the section setting unit 61 sets the sum of the yields Dn1 and Dn2 as a yield Dn of that section.

Furthermore, with regard to a single spread amount map M2 indicating a single agricultural field, the section setting unit 61 divides the spread amount map M2 into a plurality of sections Qn (the number n of sections: n=1, 2, 3 . . . and n) using the vertical dimension L1 and the horizontal dimension L2.

The spread amount setting unit 62 sets planned spread amounts Fn for the respective sections Qn on the basis of the yields Dn of the respective plurality of sections Qn. For example, the spread amount setting unit 62 sets each planned spread amount Fn using "planned spread amount Fn=reference spread amount+(reference yield–actual yield Dn)×constant". Note that the reference spread amount and the reference yield are values predetermined by the server 1b, and the constant is a value for conversion of yield into the amount of fertilizer to be applied. That is, the spread amount setting unit 62 makes a setting so that the planned spread amount Fn is large when the actual yield Dn is less than the reference yield, and makes a setting so that the planned spread amount Fn is small when the actual yield Dn is more than the reference yield. Note that the foregoing method of determining the planned spread amount Fn is an example. For example, the reference yield may be replaced with a target yield. A plurality of yield ranks may be set according to the amount of the actual yield Dn and the planned spread amount Fn may be set according to the yield ranks.

As has been discussed, upon completion of the setting of the sections Qn by the section setting unit 61 and setting of the planned spread amounts Fn by the spread amount setting unit 62, the yield map display section 51 displays the yield map M1 corresponding to the yields Dn and the spread amount map display section 52 displays the spread amount map M2 corresponding to the planned spread amounts Fn. For example, the yield map display section 51 displays the yield map M1 with different colors corresponding to different yields Dn, and the spread amount map display section 52 displays the spread amount map M2 with different colors corresponding to different planned spread amounts Fn.

As such, it is possible to set planned spread amounts Fn corresponding to yields Dn, i.e., it is possible to prepare a spreading plan, with the section setting unit 61 and the spread amount setting unit 62.

It is noted that the server 1b is capable of correcting a planned spread amount Fn according to a height difference ΔH1. As illustrated in FIG. 1, the server 1b includes a height difference acquisition unit 65, a spread amount acquisition unit 66, a spread amount correction unit 67, and a spread amount output unit 68. The height difference acquisition unit 65, the spread amount acquisition unit 66, and the spread amount correction unit 67 are each composed of electric/electronic component(s) and/or electric circuit(s) provided in the server 1b, program(s) stored in the server 1b, and/or the like.

For example, when a height difference button 54 displayed on the settings screen T1 is selected, the height difference acquisition unit 65 acquires height difference data stored in the storage unit 10 of the server 1b.

Upon acquisition of the height difference data by the height difference acquisition unit 65, the server 1b (section setting unit 61) prepares, from the acquired height difference data, section's height differences Kn corresponding to a plurality of sections Qn (the number n of sections: n= 1, 2, 3 . . . and n), in a similar manner to the yield map M1 and the spread amount map M2. For example, in the case where there are pieces of data Knp indicating a plurality of height differences in a single section (the number of sections: n=1, 2, 3 . . . and n, the number of pieces of data of height difference per section: p=1, 2, 3 . . . and j), the section setting unit 61 sets, as the section's height difference Kn, a piece of data pmax of the p pieces of data that is largest in height difference in the single section. For example, in the case where there are three pieces of data K11, K12, and K13 corresponding to a first section Q1, the section setting unit 61 sets the value of one of the pieces of data K11, K12, and K13 that is largest in height difference as a section's height difference K1 corresponding to the first section Q1.

Figure 3B:
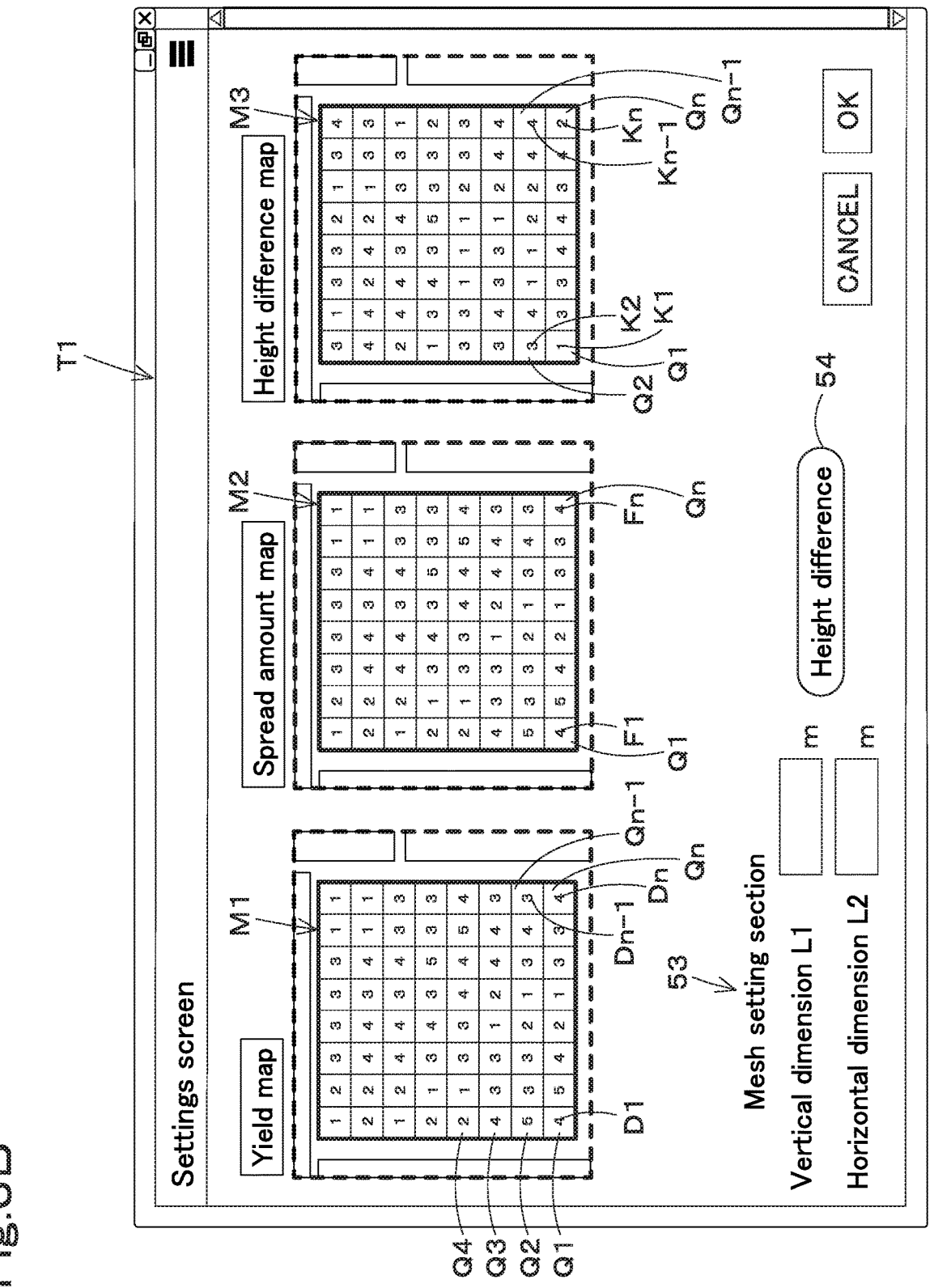
FIG. 3B illustrates a settings screen displaying a yield map, a spread amount map, and a height difference map.

Note that the setting of each section's height difference Kn described above is an example. The average value of pieces of data Knp may be set as a section's height difference Kn, and the average value of pieces of data with high reliability (within 36) of the distribution of pieces of data Knp may be set as a section's height difference Kn. A method of setting section's height differences Kn is not limited. Furthermore, as illustrated in FIG. 3B, after section's height differences Kn are determined, a height difference map M3 indicating the section's height differences Kn may be displayed on the settings screen T1.

The spread amount acquisition unit 66 acquires the planned spread amounts Fn set by the spread amount setting unit 62, when the height difference button 54 is selected. That is, the spread amount acquisition unit 66 acquires the planned spread amounts Fn corresponding to the sections Qn.

After the spread amount acquisition unit 66 acquires the planned spread amounts Fn, the spread amount correction unit 67 corrects each planned spread amount Fn acquired by the spread amount acquisition unit 66 on the basis of a corresponding height difference acquired by the height difference acquisition unit 65, i.e., on the basis of the section's height difference Kn. As shown in FIG. 4, the storage unit 10 of the server 1b stores correction information indicating a relationship between height difference(s) and corresponding correction value(s) W1. As shown in FIG. 4, the correction value W1 is 1.0 when the height difference is within a reference range, the correction value W1 exceeds 1.0 as the height difference increases in the positive direction, and the correction value W1 decreases below 1.0 as the height difference increases in the negative direction. The spread amount correction unit 67 corrects the planned spread amount Fn using "corrected spread amount Gn=planned spread amount Fn×correction value W1".

More specifically, the spread amount correction unit 67 acquires the section's height difference Kn and the planned spread amount Fn corresponding to a section Qn, and refers to correction information. If the acquired section's height difference Kn is within the reference range indicated by the correction information, the spread amount correction unit 67 sets the correction value W1 corresponding to the section's height difference Kn to 1.0, and, if the acquired section's height difference Kn is outside the reference range indicated by the correction information, the spread amount correction unit 67 extracts the correction value W1 corresponding to the section's height difference Kn from the correction information according to the value of the section's height difference Kn, and applies the extracted correction value W1 to the foregoing equation to obtain the corrected spread amount Gn which is a corrected version of the planned spread amount Fn.

Note that a method of determining the corrected spread amount Gn is not limited to the foregoing example. For example, the corrected spread amount Gn may be determined using "Corrected spread amount Gn=planned spread amount Fn+correction value W1". In such a case, W1 has a positive value when the height difference is positive, the correction value W1 is 0 when the height difference is within the reference range, and the correction value W1 has a negative value when the height difference is negative.

After the correction of planned spread amounts Fn corresponding to all the sections Qn, i.e., after corrected spread amounts Gn are determined, the spread amount correction unit 67 stores the determined corrected spread amounts Gn in the storage unit 10. Note that each corrected spread amount Gn is associated with position information of a corresponding section Qn, and it is possible to identify the position at which the corrected spread amount Gn is used.

For example, upon receipt of a request for a spreading plan from the management computer 1*a*, the spread amount output unit 68 sends the corrected spread amounts Gn and the positions (latitude, longitude) corresponding to the corrected spread amounts Gn (sections Qn) to the management computer 1*a*. Upon acquisition of the corrected spread amounts Gn and the positions (latitude, longitude) corresponding to the sections Qn, the management computer 1*a* can display a map (spread amount map) indicating the corrected spread amounts Gn on a screen.

Although planned spread amounts Fn are determined on the basis of yields Dn in the foregoing embodiment, the planned spread amounts Fn may be determined on the basis of crop composition data (protein content, water content) in addition to the yields Dn.

The spread amount setting unit 62 sets planned spread amounts Fn for a respective plurality of sections Qn on the basis of yields Dn of the respective sections Qn and protein content Xn (n=1, 2, 3 . . . and so on) of the respective sections Qn. The spread amount setting unit 62 refers to a yield/protein evaluation database 13 provided in the server 1*b*. As shown in FIG. 5, the evaluation database 13 indicates a relationship of spread amounts G1 to G9 with a relationship between yield Dn and protein content Xn. For example, if a yield Dn is greater than A and protein content Xn is less than D, the spread amount setting unit 62 sets the spread amount G3 as a planned spread amount Fn. After the planned spread amount Fn is set, the spread amount correction unit 67 corrects the planned spread amount Fn in a similar manner to that described earlier.

A spreading support system includes a height difference acquisition unit 65 to acquire a height difference in an agricultural field, a spread amount acquisition unit 66 to acquire a planned spread amount which is an amount of an object to be spread on the agricultural field, a spread amount correction unit 67 to correct, on the basis of the height difference acquired by the height difference acquisition unit 65, the planned spread amount Fn acquired by the spread amount acquisition unit 66 to obtain a corrected spread amount Gn, and a spread amount output unit 68 to output the corrected spread amount Gn. With this, because the planned spread amount Fn which is the amount of an object to be spread is corrected according to the height difference in the agricultural field, it is possible to spread the object according to height difference.

The spreading support system further includes a section setting unit 61 to divide the agricultural field into a plurality of sections, and a spread amount setting unit 62 to set planned spread amounts for the respective plurality of sections, wherein the spread amount acquisition unit 66 acquires the planned spread amounts Fn for the respective plurality of sections set by the spread amount setting unit 62, the height difference acquisition unit 65 acquires a plurality of the height differences in the respective plurality of sections, and the spread amount correction unit 67 corrects the planned spread amounts Fn for the respective plurality of sections on the basis of the height differences in the respective plurality of sections. With this, for example, a single agricultural field can be divided into a plurality of sections, and the object can be spread in amounts corresponding to the height differences in the plurality of sections. That is, when focus is placed on a single agricultural field, the object can be spread in consideration of the height difference at each position.

The spreading support system further includes a storage unit 10 to store correction information indicating a relationship between the height difference and a corresponding correction value, wherein the spread amount correction unit 67 corrects the planned spread amount Fn by multiplying the planned spread amount Fn by the correction value indicated by the correction information or by adding the correction value indicated by the correction information to the planned spread amount Fn. With this, it is possible to easily correct the planned spread amount Fn using the correction value.

The spread amount acquisition unit 66 acquires the height difference measured by an unmanned air vehicle or an agricultural machine. This makes it possible to correct the planned spread amount Fn using the height difference obtained when agricultural work was done by an unmanned air vehicle or an agricultural machine.

The spreading support system further includes a spread amount setting unit 62 to calculate the planned spread amount Fn on the basis of a relationship between a yield of a crop and a component contained in the crop. This makes it possible to determine the planned spread amount Fn according to the relationship between the yield and the composition of the crop, and also possible to correct the planned spread amount Fn according to height difference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spreading support system comprising:
a harvest vehicle configured to harvest crops from a surface of soil in an agricultural field, the harvest vehicle being configured to detect a yield of the harvested crop;
a land vehicle, including:
a position detector to detect a position of the land vehicle;
a height detector to detect a height of the land vehicle above the surface of soil in an agricultural field, the height detector including an inertial measurement unit which includes an acceleration sensor to detect acceleration, and a gyroscope sensor to detect angular velocity, the inertial measurement unit being capable of detecting roll angle, pitch angle, and yaw angle of the land vehicle; and
a height difference data generator to generate data about differences in elevation of the land vehicle based on the position given by the position detector and the height determined by the height detector;
a storage to store correction information indicating a correction value which varies according to variation of a height difference that is a difference in height of the surface of soil in an agricultural field from a reference height based at least on the height difference data provided by the land vehicle; and a controller configured or programmed to:

acquire the height difference at a target position in an agricultural field based on the height difference data from the land vehicle;

acquire a planned spread amount which is an amount of an object to be spread on a surface of soil at the target position in the agricultural field, based on at least the yield of crop information provided by the harvest vehicle;

determine the correction value corresponding to the acquired height difference at the target position based on the correction information stored in the storage;

correct, based on the acquired height difference and the determined correction value, the acquired planned spread amount to obtain a corrected spread amount for the target position; and output, for the target position, the corrected spread amount;

wherein the correction information stored in the storage indicates that:

the correction value corresponding to the height difference which indicates that a surface of soil at a position where the height difference is acquired is at the reference height, higher than the reference height and in a higher height range from the reference height, or lower than the reference height and in a lower height range from the reference height is a value which, if used to correct the planned spread amount, does not increase or decrease the planned spread amount to the corrected spread amount;

the correction value corresponding to the height difference which indicates that a surface of soil at a position where the height difference is acquired is higher than the reference height and above the higher height range from the reference height is a value which, if used to correct the planned spread amount, increases the planned spread amount to the corrected spread amount; and the correction value corresponding to the height difference which indicates that a surface of soil at a position where the height difference is acquired is lower than the reference height and below the lower height range from the reference height is a value which, if used to correct the planned spread amount, decreases the planned spread amount to the corrected spread amount.

2. The spreading support system according to claim 1, wherein the controller is configured or programmed to:

divide the agricultural field into a plurality of sections each of which is to be the target position;

set planned spread amounts for the respective plurality of sections;

acquire the planned spread amounts for the set respective plurality of sections;

acquire a plurality of the height differences in the respective plurality of sections;

determine, for the respective plurality of sections, the correction values corresponding to the respective plurality of height differences based on the correction information stored in the storage; and correct the planned spread amounts for the respective plurality of sections based on the acquired height differences in the respective plurality of sections and the determined correction values for the respective plurality of sections.

3. The spreading support system according to claim 1, wherein the controller is configured or programmed to correct the planned spread amount by multiplying the planned spread amount by the determined correction value or by adding the determined correction value to the planned spread amount.

4. The spreading support system according to claim 1, wherein the controller is configured or programmed to calculate the planned spread amount based on a relationship between a yield of a crop and a component contained in the crop.

5. The spreading support system according to claim 1, wherein:

the correction value is a multiplier to be multiplied with the planned spread amount when the correction value is used to correct the planned spread amount; and the correction information stored in the storage indicates that a reference value of the correction value is one, the correction value corresponding to the height difference which indicates that a surface of soil at a position where the height difference is acquired is higher than the reference height and above the higher height range from the reference height is greater than one; and the correction value corresponding to the height difference which indicates that a surface of soil at a position where the height difference is acquired is lower than the reference height and below the lower height range from the reference height is less than one.

6. The spreading support system according to claim 1, wherein:

the correction value is an addend to be added to the planned spread amount when the correction value is used to correct the planned spread amount; and the correction information stored in the storage indicates that:

a reference value of the correction value is zero;

the correction value corresponding to the height difference which indicates that a surface of soil at a position where the height difference is acquired is higher than the reference height and above the higher height range from the reference height is a positive value; and the correction value corresponding to the height difference which indicates that a surface of soil at a position where the height difference is acquired is lower than the reference height and below the lower height range from the reference height is a negative value.

7. A spreading support system comprising:

a harvest vehicle configured to harvest crops from a surface of soil in an agricultural field, the harvest vehicle being configured to detect a yield of the harvested crop;

an unmanned aerial vehicle, including:

a position detector to detect a position of the unmanned aerial vehicle; and a camera;

a storage to store correction information indicating a correction value which varies according to variation of a height difference that is a difference in height of the surface of soil in an agricultural field from a reference height; and a controller configured or programmed to:

acquire the height difference at a target position in an agricultural field based on images taken by the camera of the unmanned aerial vehicle at positions determined by the position detector;

acquire a planned spread amount which is an amount of an object to be spread on a surface of soil at the target position in the agricultural field, based on at least the yield of crop information provided by the harvest vehicle;

determine the correction value corresponding to the acquired height difference at the target position based on the correction information stored in the storage;

correct, based on the acquired height difference and the determined correction value, the acquired planned spread amount to obtain a corrected spread amount for the target position; and output, for the target position, the corrected spread amount;

wherein the correction information stored in the storage indicates that:

the correction value corresponding to the height difference which indicates that a surface of soil at a position where the height difference is acquired is at the reference height, higher than the reference height and in a higher height range from the reference height, or lower than the reference height and in a lower height range from the reference height is a value which, if used to correct the planned spread amount, does not increase or decrease the planned spread amount to the corrected spread amount;

the correction value corresponding to the height difference which indicates that a surface of soil at a position where the height difference is acquired is higher than the reference height and above the higher height range from the reference height is a value which, if used to correct the planned spread amount, increases the planned spread amount to the corrected spread amount; and the correction value corresponding to the height difference which indicates that a surface of soil at a position where the height difference is acquired is lower than the reference height and below the lower height range from the reference height is a value which, if used to correct the planned spread amount, decreases the planned spread amount to the corrected spread amount.

8. The spreading support system according to claim 7, wherein the controller is configured or programmed to:

divide the agricultural field into a plurality of sections each of which is to be the target position;

set planned spread amounts for the respective plurality of sections;

acquire the planned spread amounts for the set respective plurality of sections;

acquire a plurality of the height differences in the respective plurality of sections;

determine, for the respective plurality of sections, the correction values corresponding to the respective plurality of height differences based on the correction information stored in the storage; and correct the planned spread amounts for the respective plurality of sections based on the acquired height differences in the respective plurality of sections and the determined correction values for the respective plurality of sections.

9. The spreading support system according to claim 7, wherein the controller is configured or programmed to correct the planned spread amount by multiplying the planned spread amount by the determined correction value or by adding the determined correction value to the planned spread amount.

10. The spreading support system according to claim 7, wherein the controller is configured or programmed to calculate the planned spread amount based on a relationship between a yield of a crop and a component contained in the crop.

11. The spreading support system according to claim 7, wherein:

the correction value is a multiplier to be multiplied with the planned spread amount when the correction value is used to correct the planned spread amount; and the correction information stored in the storage indicates that a reference value of the correction value is one, the correction value corresponding to the height difference which indicates that a surface of soil at a position where the height difference is acquired is higher than the reference height and above the higher height range from the reference height is greater than one; and the correction value corresponding to the height difference which indicates that a surface of soil at a position where the height difference is acquired is lower than the reference height and below the lower height range from the reference height is less than one.

12. The spreading support system according to claim 7, wherein:

the correction value is an addend to be added to the planned spread amount when the correction value is used to correct the planned spread amount; and the correction information stored in the storage indicates that:

a reference value of the correction value is zero;

the correction value corresponding to the height difference which indicates that a surface of soil at a position where the height difference is acquired is higher than the reference height and above the higher height range from the reference height is a positive value; and the correction value corresponding to the height difference which indicates that a surface of soil at a position where the height difference is acquired is lower than the reference height and below the lower height range from the reference height is a negative value.

* * * * *